(12) United States Patent
Okuno

(10) Patent No.: US 8,559,112 B2
(45) Date of Patent: Oct. 15, 2013

(54) OPTICAL ELEMENT

(75) Inventor: Takeharu Okuno, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 692 days.

(21) Appl. No.: 12/704,805

(22) Filed: Feb. 12, 2010

(65) Prior Publication Data

US 2010/0208353 A1    Aug. 19, 2010

(30) Foreign Application Priority Data

Feb. 17, 2009   (JP) ................................. 2009-034036

(51) Int. Cl.
*G02B 1/10*   (2006.01)
(52) U.S. Cl.
USPC ......................................... 359/581; 359/900
(58) Field of Classification Search
USPC .................. 359/580, 581, 599, 601
See application file for complete search history.

(56) References Cited

U.S. PATENT DOCUMENTS

| | | | | |
|---|---|---|---|---|
| 4,190,321 A | * | 2/1980 | Dorer et al. ................... | 359/581 |
| 4,396,643 A | * | 8/1983 | Kuehn et al. .................. | 427/160 |
| 5,306,339 A | * | 4/1994 | Takeda et al. .............. | 106/38.27 |
| 6,973,806 B2 | * | 12/2005 | Yoshikuni et al. ............. | 65/25.1 |
| 7,619,821 B2 | * | 11/2009 | Yamada et al. ................ | 359/581 |
| 2005/0094277 A1 | * | 5/2005 | Khusnatdinov et al. ...... | 359/601 |
| 2005/0219705 A1 | * | 10/2005 | Tanaka .......................... | 359/601 |
| 2007/0195419 A1 | * | 8/2007 | Tsuda et al. ................... | 359/601 |
| 2009/0257127 A1 | * | 10/2009 | Okayama et al. ............. | 359/601 |

FOREIGN PATENT DOCUMENTS

| | | | |
|---|---|---|---|
| JP | 2004-250295 A | 9/2004 |
| JP | 2005-062526 A | 3/2005 |
| JP | 2006-171430 A | 6/2006 |
| JP | 2007-025435 A | 2/2007 |
| JP | 2007-283581 A | 11/2007 |

* cited by examiner

*Primary Examiner* — Alessandro Amari
(74) *Attorney, Agent, or Firm* — Canon U.S.A., Inc. IP Division

(57) ABSTRACT

An optical element includes an optical surface formed by a press molding method, wherein a ray effective portion of the optical surface has formed thereon an antireflection structure including a minute uneven structure, which contains a component different from that of a base of the optical element and has an average pitch of 400 nm or less.

12 Claims, 5 Drawing Sheets

OPTICAL ELEMENT

BACKGROUND OF THE INVENTION

1. Field of the Invention

The present invention relates to an optical element, and particularly to an optical element having an antireflection structure formed on the surface of the optical element that is formed by a press molding method, wherein the antireflection structure has a minute uneven structure whose average pitch is 400 nm or less.

2. Description of the Related Art

An optical element (lens) using a transparent medium (transparent member) such as a glass or plastic is generally subject to a surface treatment of forming an antireflection film on a light entrance surface to reduce a loss of transmitted light by a surface reflection. For example, a multi-layer film (so-called multi-coat) formed by stacking a plurality of dielectric thin films has been known as the antireflection film for visible light. The multi-layer film is formed by forming a metal oxide on the surface of the transparent member by a vacuum deposition or a sputtering method.

However, since the antireflection film formed by this process utilizes the interference of the reflected light generated at the surface and interface of each film, there is a problem that a sufficient antireflection property cannot be obtained for light other than the designed wavelength and designed incident angle.

As another antireflection method, there has been known a method for forming a minute uneven structure on the surface of the transparent member. When the pitch of the minute uneven structure is not greater than a wavelength, and has a pyramidal shape such as a circular cone or a square pyramid, the pitch becomes equivalent to a film whose refractive index gradually changes from air toward a substrate, so that an antireflection property excellent in wavelength band characteristic and incident angle characteristic can be obtained.

Japanese Patent Application Laid-Open No. 2007-283581 discusses a method in which a crown boron silicate glass is press-molded with the use of a molding die having a minute uneven structure on its surface, and the shape of the minute uneven structure is transferred onto the surface of an optical element to reduce the surface reflection.

Since the optical element formed by the technique discussed in Japanese Patent Application Laid-Open No. 2007-283581 has the antireflection structure including the minute uneven structure on its surface, it is expected to have an antireflection property excellent in a wavelength band characteristic and an incident angle characteristic.

Unlike an optical element having a spherical optical surface, an optical element having only an aspherical optical surface is difficult to form only by grinding. Therefore, a press molding method is generally used. However, a glass that has a low glass transition point (Tg) and used for the press molding is low in chemical durability, so that a problem as the optical element arises such as a surface deterioration generally called "tarnish" or "cloud" caused by a deposited substance. Further, when the minute uneven structure is formed on the surface of the glass, the surface area increases, with the result that the tarnish or cloud is more likely to occur than on a flat surface (on an ordinary lens surface).

SUMMARY OF THE INVENTION

The present invention is directed to an optical element that realizes an antireflection property excellent in a wavelength band characteristic and an incident angle characteristic, and that has little tarnish or cloud on its surface, even when the optical element is formed by a press molding process.

According to an aspect of the present invention, an optical element includes an aspherical optical surface formed by a press molding method, wherein a ray effective portion of the optical surface has formed thereon an antireflection structure including a minute uneven structure, which contains a component different from that of abase of the optical element and has an average pitch of 400 nm or less.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Figure 1:
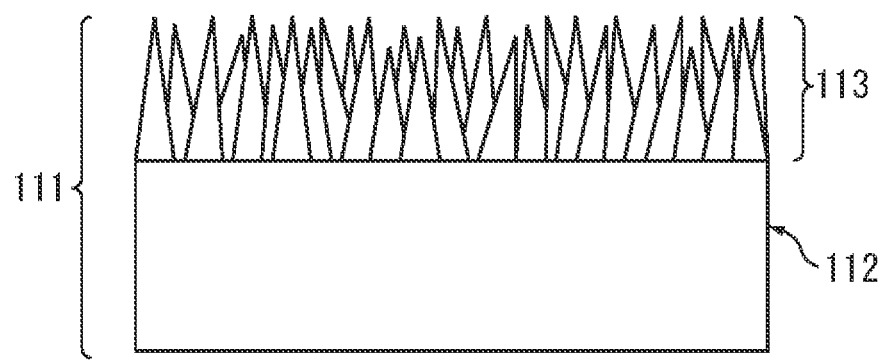
FIG. 1 is a schematic sectional view illustrating an antireflection structure having a minute uneven structure according to an exemplary embodiment of the present invention.

Various exemplary embodiments, features, and aspects of the invention will be described in detail below with reference to the drawings.

An optical element (lens) according to an exemplary embodiment of the present invention is formed by a press molding method and has at least one aspherical optical surface. An antireflection structure, which has a minute uneven structure that contains a component different from that of a base of the optical element and has an average pitch of 400 nm or less, is formed on at least a part of a ray effective portion of the aspherical surface. Specifically, the pitch of the minute uneven structure becomes equivalent to a film whose refractive index gradually changes from air to the substrate within the range of the used wavelength. Therefore, the optical element has an antireflection property excellent in a wavelength band characteristic and an incident angle characteristic.

The minute uneven structure according to the exemplary embodiment of the present invention can be formed as a grating pitch P that satisfies the conditions of a zeroth-order grating. The minute uneven structure is referred to as a subwave structure (SWS). The grating pitch P is equal to or less than the wavelength of a usable light source (nanometer scale), and is directed to the use of zeroth-order light having no diffraction action.

Furthermore, the minute uneven structure according to the exemplary embodiment of the present invention contains a substance (e.g., aluminum or aluminum oxide) that is different from the component of the optical element, so that the minute uneven structure is an inorganic substance excellent in chemical durability. Therefore, the antireflection structure having the minute uneven structure not only suppresses the reflection on the interface of the optical element but also protects the base of the optical element, thereby being capable of preventing the occurrence of tarnish or cloud.

The minute uneven structure whose average pitch is 400 nm or less may be formed by any methods. Examples of the methods include the one in which solution containing aluminum oxide is applied onto the surface of the lens with a sol-gel process to form a film, and then, the film is immersed into warm water of 40° C. or more and 100° C. or less to form the minute uneven structure. This method can form the minute uneven structure with low cost even on the surface of an optical element having a large area and having an aspherical surface with a great curvature.

According to the method in which the minute uneven shape formed on the molding die is transferred, the minute uneven structure might be broken upon the mold release, or surface deformation or abnormal distribution in the refractive index might be generated since the release stress is increased, in the case of the lens having a half-opening angle of 30° or more. However, this method can prevent the break of the minute uneven structure, surface deformation, and the abnormal distribution in the refractive index even in the lens including the portion having a half-opening angle of 30° or more.

FIG. 1 is a schematic sectional view illustrating an antireflection structure having a minute uneven structure according to an exemplary embodiment of the present invention. In FIG. 1, an optical element 111 includes a glass base 112 and an antireflection structure 113 having a minute uneven structure.

The antireflection structure 113, which has the minute uneven structure that is made of a material containing aluminum oxide and that has an average pitch of 400 nm or less, is formed on the glass base 112 having a refractive index ($n_d$) of 1.583, a refractive index dispersion ($v_d$) of 59.4, and a glass transition point (Tg) of 506° C. The reason why the average pitch is set to be 400 nm or less is as follows. Specifically, if the average pitch is greater than 400 nm, harmful rays may be generated due to diffraction with visible light.

Figure 2:
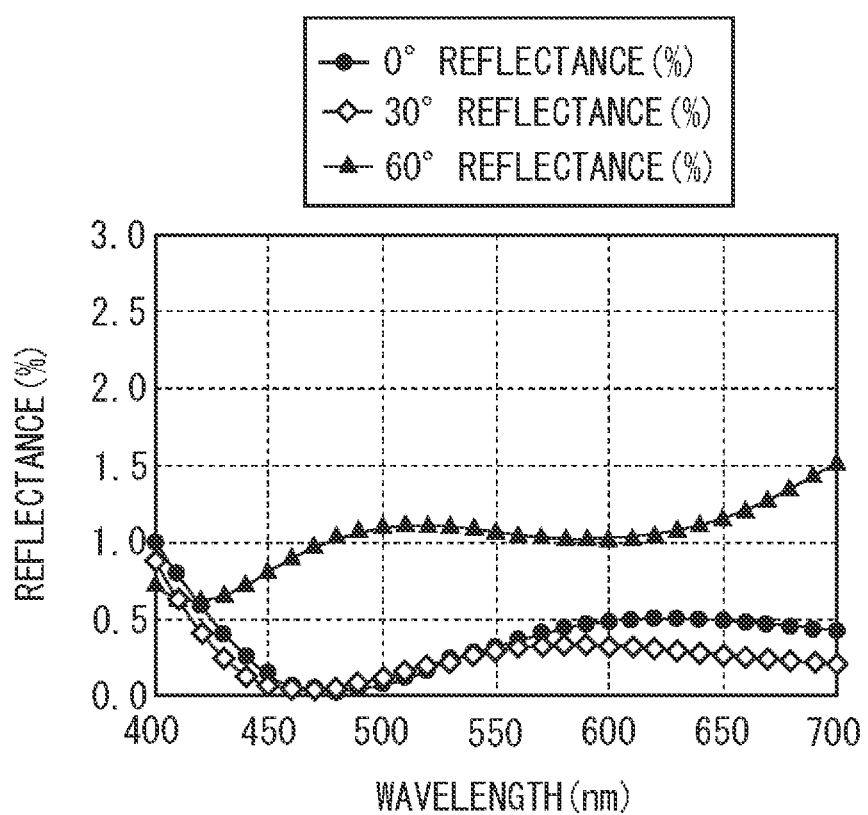
FIG. 2 is a graph illustrating a reflectance of the antireflection structure having the minute uneven structure according to an exemplary embodiment of the present invention.

FIG. 2 illustrates the reflectance of the optical element 111 having the antireflection structure formed thereon. Since the antireflection structure having the minute uneven structure of not greater than the wavelength is formed, the reflectance is 1.6% or less in a wide wavelength band that is all the visual light range and within the large incident angle range that is 0° or more and 60° or less, which means that the optical element 111 exhibits a very satisfactory antireflection characteristic.

The glass base 112 is a glass used for the press molding. The glass base 112 contains at least one of an alkali metal and alkali earth metal to lower the glass transition point (Tg). Since at least one of the alkali metal and the alkali earth metal is contained, the glass transition point of the glass base can be set to be 300° or more and 620° or less. Consequently, it can suitably be used as the glass for the press molding.

If the glass base described above is left with the surface of the base exposed, it is reacted with oxygen or water content in air to cause problems such as tarnish or cloud. However, the surface is covered with the film (minute uneven structure) 113 containing aluminum oxide or aluminum, which is a chemically stable inorganic substance, in the present exemplary embodiment, so that the generation of tarnish or cloud can be prevented even if the optical element 111 is used under the environment of high temperature and high humidity. A very small area is illustrated as enlarged in FIG. 1, so that the glass base 112 is illustrated as if it is plane. However, actually, the glass base 112 has an aspherical surface.

Figure 3:
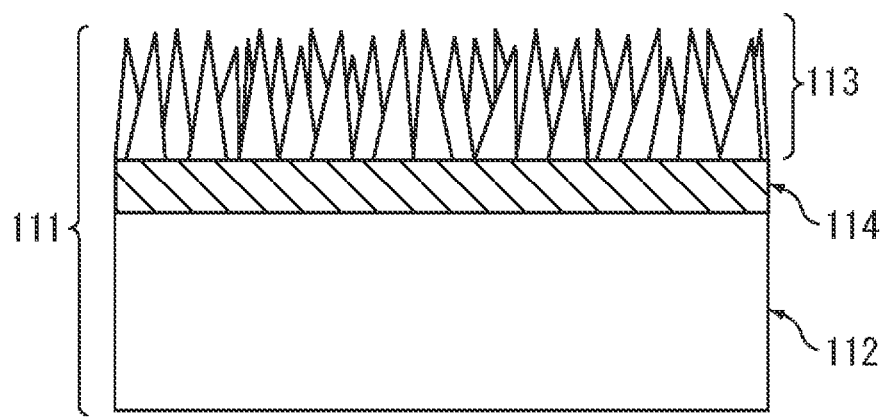
FIG. 3 is a schematic sectional view illustrating an antireflection structure having a minute uneven structure according to an exemplary embodiment of the present invention.

A thin layer 114 may be provided between the glass base 112 and the minute uneven structure 113, as illustrated in FIG. 3, according to the refractive index or material of the glass base 112. The thin layer 114 is a single-layer film in FIG. 3. However, it may be a multi-layer film. With this structure, the present invention can exhibit high effect within the range of the refractive index of the glass base ($n_d$) of 1.51 or more and 1.95 or less.

Figure 4:
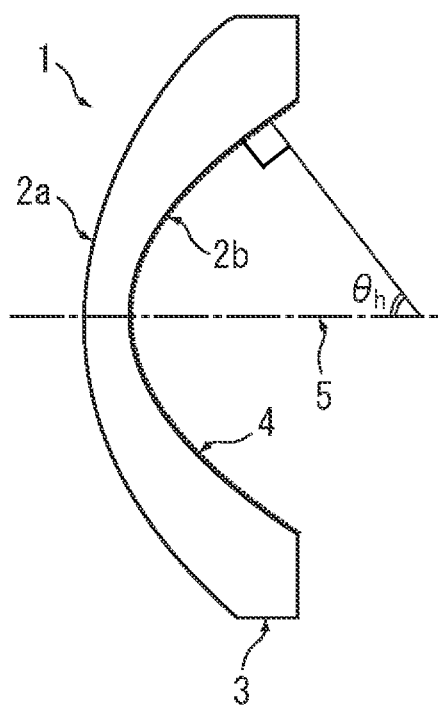
FIG. 4 is a schematic sectional view illustrating an optical element according to a first exemplary embodiment of the present invention.

FIG. 4 is a schematic sectional view of an optical element according to a first exemplary embodiment of the present invention. In FIG. 4, an optical element 1 includes ray effective portions 2a and 2b, a non-ray effective portion 3, and an antireflection structure 4 having a minute uneven structure. An optical axis 5 is also illustrated in FIG. 4.

In FIG. 4, the base of the optical element 1 is a meniscus lens formed by press-molding a glass material that has a refractive index ($n_d$) of 1.58, a refractive index dispersion ($v_d$) of 59.4, and a glass transition point (Tg) of 506° C. The base of the optical element 1 contains silicon oxide as its main component. The base also contains lithium, which is an alkali metal, or barium, which is an alkali earth metal, to lower the glass transition point. Therefore, it is a glass base on which tarnish or cloud is easy to occur when the glass surface is exposed.

The ray effective portion 2a is a spherical surface having a curvature radius of 31.87 mm and an effective diameter of 49.96 mm. The ray effective portion 2b is an aspherical surface having an effective diameter of 37.29 mm. When the surface position in the optical axis direction at the position away from the optical axis by a distance R in the direction perpendicular to the optical axis is defined as Sag(R), the ray effective portion 2b has a shape satisfying the equation described below:

$$Sag(R) = \frac{(1/r) \times R^2}{1 + \sqrt{1 - (1+K) \times (1/r)^2 \times R^2}} + \\ A4 \times R^4 + A6 \times R^6 + A8 \times R^8 + A10 \times R^{10} + A12 \times R^{12}$$

wherein $r$=13.52

$K$=−6.05×10$^{-1}$ $A4$=2.34×10$^{-7}$ $A6$=−5.85×10$^{-8}$ $A8$=2.32×10$^{-10}$ $A10$=−8.25×10$^{-13}$ $A12$=0.

The maximum half-opening angle $\theta_h$ of this surface is 53.4°.

An antireflection film including a dielectric multi-layer film is formed on the ray effective portion 2a.

The antireflection structure 4 including the minute uneven structure, which is made of a material containing an aluminum oxide and has an average pitch of 400 nm or less, is formed on the ray effective portion 2b. Therefore, the optical element 1 can prevent the generation of tarnish or cloud even under the environment of high temperature and high humidity, and has an excellent environmental reliability.

In the optical element having the aspherical optical surface, when the optical element is used for an imaging optical system and the aspherical surface becomes the surface that produces a ghost, the produced ghost has, different from the spherical surface, a distorted shape (deformed shape), which is very harmful for forming an image. However, in the present exemplary embodiment, the generation of a ghost can be prevented even if the optical element is used for the optical system, with the result that a high-quality optical system can be realized, since the antireflection structure 4, which is excellent in the wavelength band characteristic and the incident angle characteristic, is formed on the ray effective portion 2b having the aspherical shape.

Although the present exemplary embodiment shows the case of the meniscus lens, the present invention is not limited thereto. An optical element having any shape, such as a biconvex lens, biconcave lens, prism, etc., may be employed, so long as it is formed by a press molding method and has an aspherical optical surface.

Figure 5:
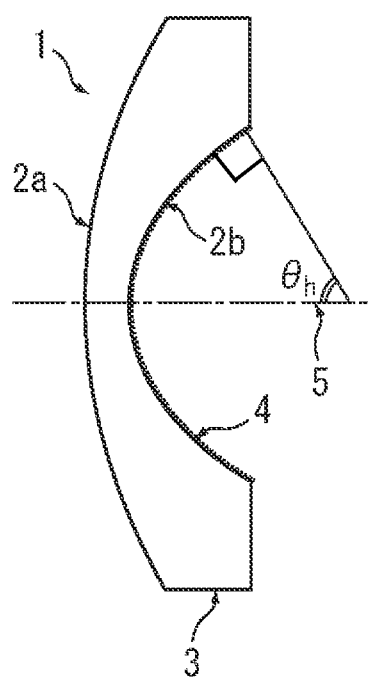
FIG. 5 is a schematic sectional view illustrating an optical element according to a second exemplary embodiment of the present invention.

FIG. 5 is a schematic sectional view of an optical element according to a second exemplary embodiment of the present invention. The components in FIG. 1 similar to those in FIG. 1 are identified by the same numerals.

In FIG. 5, the base of the optical element 1 is a meniscus lens formed by press-molding a glass material that has a refractive index ($n_d$) of 1.854, a refractive index dispersion ($v_d$) of 40.4, and a glass transition point (Tg) of 614° C. The base of the optical element 1 contains a lanthanum oxide as its main component. The base also contains potassium and lithium, which are alkali metals, to lower the glass transition point. Therefore, it is a glass base on which tarnish or cloud is easy to occur when the glass surface is exposed.

The ray effective portion 2a is a spherical surface having a curvature radius of 52.44 mm and an effective diameter of 50.09 mm. The ray effective portion 2b is an aspherical surface having an effective diameter or 32.69 mm. When the surface position in the optical axis direction at the position away from the optical axis by the distance R in the direction perpendicular to the optical axis is defined as Sag(R), the ray effective portion 2b has a shape satisfying the equation described below:

$$Sag(R) = \frac{(1/r) \times R^2}{1 + \sqrt{1 - (1+K) \times (1/r)^2 \times R^2}} + A4 \times R^4 + A6 \times R^6 + A8 \times R^8 + A10 \times R^{10} + A12 \times R^{12}$$

wherein $r = 13.78$ $K = -8.32 \times 10^{-1}$ $A4 = 1.23 \times 10^{-5}$ $A6 = -1.79 \times 10^{-8}$ $A8 = 2.37 \times 10^{-10}$ $A10 = -7.23 \times 10^{-13}$ $A12 = 9.90 \times 10^{-16}$.

The maximum half-opening angle $\theta_h$ of this surface is 59.5°.

An antireflection film including a dielectric multi-layer film is formed on the ray effective portion 2a.

A thin layer mainly made of silica is formed on the ray effective portion 2b, and the antireflection structure 4 including the minute uneven structure, which is made of a material containing an aluminum oxide and has an average pitch of 400 nm or less, is formed on the thin film. Therefore, the optical element 1 can prevent the generation of tarnish or cloud even under the environment of high temperature and high humidity, and has an excellent environmental reliability.

In the optical element having the aspherical optical surface, when the optical element is used for an imaging optical system and the aspherical surface becomes the surface that produces a ghost, the produced ghost has, different from the spherical surface, a distorted shape (deformed shape), which is very harmful for forming an image. However, in the present exemplary embodiment, the generation of a ghost can be prevented even if the optical element is used for the optical system, with the result that a high-quality optical system can be realized, since the antireflection structure 4, which is excellent in the wavelength band characteristic and the incident angle characteristic, is formed on the ray effective portion 2b having the aspherical shape.

Although the present exemplary embodiment shows the case of the meniscus lens, the present invention is not limited thereto. An optical element having any shape, such as a biconvex lens, biconcave lens, prism, etc., may be employed, so long as it is formed by a press-molding method and has an aspherical optical surface.

The optical element according to the exemplary embodiment of the present invention can be used for a lens barrel of an imaging apparatus or an optical apparatus such as an optical system in an image projection apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-034036 filed Feb. 17, 2009, which is hereby incorporated by reference herein in its entirety.

What is claimed is:

1. A method comprising:
   forming an aspherical optical surface of an optical element by a press molding method, wherein the optical element is made of a glass containing at least one of an alkali metal and an alkali earth metal;
   forming a film on the aspherical optical surface by a sol-gel process, wherein the film is made of a material containing at least one of an aluminum or an aluminum oxide; and
   forming an antireflection structure including a minute uneven structure on the aspherical optical surface by immerging the film into warm water having temperature of between 40° C. and 100° C.,
   wherein the minute uneven structure has an average pitch of 400 nm or less, and
   wherein the optical element is made of a glass having a refractive index of 1.583, a refractive index dispersion of 59.4 and transition point of 506° C.

2. The method according to claim 1, wherein the aspherical optical surface includes a portion having a half-opening angle of approximately 30° or more.

3. The method according to claim 1, wherein the optical element includes a negative meniscus lens, and
   the antireflection structure is formed on a concave surface of the negative meniscus lens.

4. A method comprising:
   forming an aspherical optical surface of an optical element by a press molding method, wherein the optical element is made of a glass containing at least one of an alkali metal and an alkali earth metal;

forming a film on the aspherical optical surface by a sol-gel process, wherein the film is made of a material containing at least one of an aluminum or an aluminum oxide; and forming an antireflection structure including a minute uneven structure on the aspherical optical surface by immerging the film into warm water having temperature of between 40° C. and 100° C., wherein the minute uneven structure has an average pitch of 400 nm or less, and wherein the optical element is made of a glass having a refractive index of 1.854, a refractive index dispersion of 40.4 and transition point of 614° C.

5. The method according to claim 4, wherein the aspherical optical surface includes a portion having a half-opening angle of approximately 30° or more.

6. The method according to claim 4, wherein the optical element includes a negative meniscus lens, and the antireflection structure is formed on a concave surface of the negative meniscus lens.

7. A method of manufacturing an optical apparatus comprising:

forming an aspherical optical surface of an optical element by a press molding method, wherein the optical element is made of a glass containing at least one of an alkali metal and an alkali earth metal;

forming a film on the aspherical optical surface by a sol-gel process, wherein the film is made of a material containing at least one of an aluminum or an aluminum oxide; and forming an antireflection structure including a minute uneven structure on the aspherical optical surface by immerging the film into warm water having temperature of between 40° C. and 100° C., wherein the minute uneven structure has an average pitch of 400 nm or less, and wherein the optical element is made of a glass having a refractive index of 1.583, a refractive index dispersion of 59.4 and transition point of 506° C.

8. The method according to claim 7, wherein the aspherical optical surface includes a portion having a half-opening angle of approximately 30° or more.

9. The method according to claim 7, wherein the optical element includes a negative meniscus lens, and the antireflection structure is formed on a concave surface of the negative meniscus lens.

10. A method of manufacturing an optical apparatus comprising:

forming an aspherical optical surface of an optical element by a press molding method, wherein the optical element is made of a glass containing at least one of an alkali metal and an alkali earth metal;

forming a film on the aspherical optical surface by a sol-gel process, wherein the film is made of a material containing at least one of an aluminum or an aluminum oxide; and forming an antireflection structure including a minute uneven structure on the aspherical optical surface by immerging the film into warm water having temperature of between 40° C. and 100° C., wherein the minute uneven structure has an average pitch of 400 nm or less, and wherein the optical element is made of a glass having a refractive index of 1.854, a refractive index dispersion of 40.4 and transition point of 614° C.

11. The method according to claim 10, wherein the aspherical optical surface includes a portion having a half-opening angle of approximately 30° or more.

12. The method according to claim 10, wherein the optical element includes a negative meniscus lens, and the antireflection structure is formed on a concave surface of the negative meniscus lens.

* * * * *